F. W. MIX.

Assignor to CORBIN CABINET LOCK COMPANY.

CABINET LOCK.

No. 10,460. Reissued Mar. 11, 1884.

Witnesses.
John Edwards Jr.
Eddy N. Smith

Inventor.
Frank W. Mix.
By James Shepard
Atty.

N. PETERS, Photo-Lithographer, Washington, D. C.

UNITED STATES PATENT OFFICE.

FRANK W. MIX, OF NEW BRITAIN, CONNECTICUT, ASSIGNOR TO CORBIN CABINET LOCK COMPANY, OF SAME PLACE.

CABINET-LOCK.

SPECIFICATION forming part of Reissued Letters Patent No. 10,460, dated March 11, 1884.

Original No. 286,327, dated October 9, 1883. Application for reissue filed December 31, 1883.

*To all whom it may concern:*

Be it known that I, FRANK W. MIX, a citizen of the United States, residing at New Britain, in the county of Hartford and State of Connecticut, have invented certain new and useful Improvements in Cabinet-Locks, of which the following is a specification.

My invention relates to improvements in cabinet-locks, and is especially adapted for use upon a desk having a rolling cover.

Figure 1:
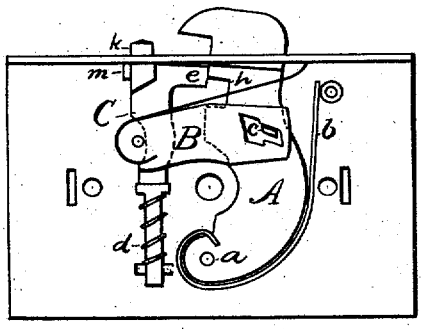
Figure 2:
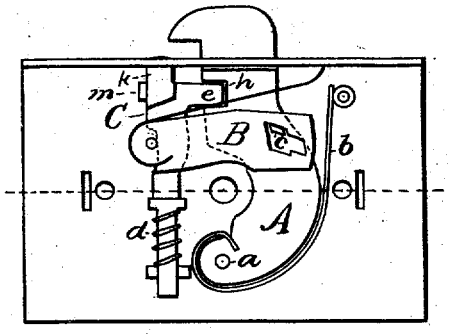
Figure 3:
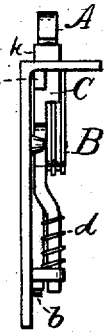
Figure 4:
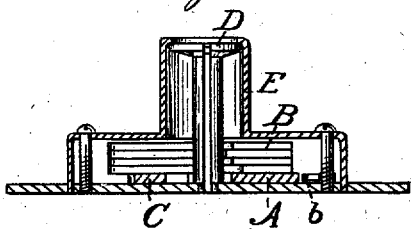
Figure 5:
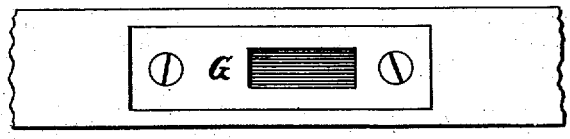
Figure 6:
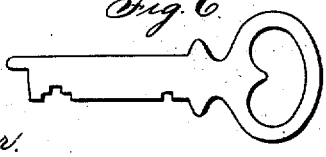

In the accompanying drawings, Figure 1 is a front elevation of my lock with the cap-plate and key-hub removed, and with the lock-bolt in its unlocked position. Fig. 2 is a like view with the lock-bolt in the locked position. Fig. 3 is a side elevation of the parts represented in Fig. 1. Fig. 4 is a horizontal section of the lock, looking upward. Fig. 5 is a view of the keeper-plate, and Fig. 6 is a side elevation of the key.

For the convenience of description I have and shall refer to the parts as if they were located in the position shown in the drawings; but in use the position of the lock will be inverted, and that which is now the upper end of the bolt will be the lower end, the keeper will be placed upon the top of the desk, ready to receive the lock-bolt as it is brought downward upon the same.

A represents a swinging bolt pivoted at *a*, and pressed upon continually by the spring *b*, with a tendency to throw it into its locked position. Upon this bolt is the fence *c*, which rests in the opening of the tumblers B, which tumblers are spring-pressed and act upon the fence to hold the bolt in its locked position, as in other locks employing tumblers and bolts.

C designates a sliding bolt, which is pressed upward continually by means of the spring *d*. Said sliding bolt is provided with a laterally-extending arm, *e*, which, when the desk is locked, enters the slot *h* in the lock-bolt, and thereby prevents the sliding bolt from being forced upward under the influence of its spring *d*. A slotted hub, D, and cylinder E, Fig. 4, of ordinary construction, are provided for insertion and guidance of the flat key, Fig. 6. By applying the key to the lock and rotating it to lift the tumblers and allow the fence and the bolt to pass from the position shown in Fig. 2 to that shown in Fig. 1, the arm *e* of the sliding bolt C is liberated, and the spring D immediately forces said plate upward from the position shown in Fig. 2 to that represented in Fig. 1, when the end of this arm will engage the edge of the swinging bolt A and hold it in its unlocked position, as shown in Fig. 1. When the desk is closed, the keeper-plate G, Fig. 5, will engage the projecting end *k* and force the sliding bolt inward against the power of its spring, when the lock-bolt A will snap into engagement and over the arm *e* of said sliding bolt, thereby holding said bolt within the case. The tumblers B also snap down upon the fence *c* and positively secure the lock-bolt in its position for locking. When the desk is again unlocked and opened, the sliding bolt C projects again and holds the parts in their unlocked position until the desk is closed again. The parts may then be automatically released, ready to snap into position for locking, and therefore the application of a key is unnecessary. In order to stop the sliding bolt C with its end *k* projected a proper distance and the arm *e* in proper position to hold the lock-bolt A, the bolt C is provided with the stop *m*, which engages the inner side of the face-plate E of the lock-case. If this stop were omitted, the same function would be performed by the upper edge of the arm *e*. The sliding bolt C may be termed "mechanism for holding the lock-bolt or parts of the lock in the unlocked position." Mechanism for this purpose may be readily devised which will not necessarily be in the form of a sliding bolt, and when located at a point inside the hooked end of the lock-bolt, and provided with a projection which extends through the face of the lock-case for engagement with the keeper, to automatically release the parts for locking upon closing the desk, will be considered the equivalent of the sliding bolt C.

I have herein shown this lock with a long cylindrical case, E, to adapt the lock to be placed upon the side of the rail or edge-piece of the cover; but this lock mechanism may be embodied in a mortise-lock with a shorter cylindrical case; and I intend to make another application showing such a mortise-lock, which is adapted to receive the lock mechanism herein shown and described.

While the lock herein shown is especially adapted for a flat key, it is evident that mechanism having a projection in the face of the lock for releasing the parts for locking may be used in locks which do not employ a flat key.

I am aware that the following features are found in the prior art, as shown by United States patents, viz: The combination of swinging and hooked lock-bolts provided with a fence, and swinging and slotted tumblers, the tumblers and bolt both having edge faces or talons for engaging the key; the combination of a swinging hooked lock-bolt, two springs for pressing upon said bolt in opposite directions, a spring-pressed sliding bolt for acting upon the hooked end of the lock-bolt to hold it in the unlocked position, and for being acted upon by the end of the padlock-shackle, and a set of swinging tumblers, the same being wholly within a padlock-case, and so that the key never can be brought into contact with the swinging and hooked lock-bolt; and the combination of a sliding lock-bolt, swinging tumblers, and a latch for holding the bolt in its unlocked position, and for being acted upon by the keeper-staple to release said bolt for locking, the parts being all arranged wholly within the lock-case. All of said prior art is hereby disclaimed.

The importance of having the lock-bolt and sliding bolt both project through the face of the lock will be apparent when the fact is taken into consideration that my lock is intended for use upon a desk-cover, with the keeper placed upon the table portion of the desk, where it is essential to have it flat and smooth. It is for this reason that I make my keeper in plate form. Such a keeper cannot be used in connection with any of the prior locks hereinbefore disclaimed.

I claim as my invention—

1. The combination of the swinging and hooked lock-bolt having a talon or edge face for being acted upon by the key for throwing the bolt backward out of engagement with the keeper, and also having its hooked end projecting from the face of the lock-case, the swinging tumblers and fence for holding said bolt in its position for locking, and mounted so as to be acted upon by the same key which acts upon said lock-bolt, suitable springs for pressing upon said bolt, and tumblers to force them into position for locking, and the spring-pressed bolt C or equivalent mechanism for snapping into engagement with the lock-bolt at a point inside of its hooked end and holding said bolt back when unlocked, said mechanism also having the projection in the face of the lock-case for being acted upon at a point outside of the case, to disengage the hooked lock-bolt, substantially as described, and for the purpose specified.

2. The combination of the spring-pressed swinging lock-bolt A, having a talon or edge face for being acted upon by the key, spring-pressed sliding bolt C, having projection *k*, and the laterally-extending arm *e*, for engagement with the keeper and lock-bolt, respectively, and a stop to limit the distance which the end *k* projects, substantially as described, and for the purpose specified.

3. The combination of the spring-pressed swinging lock-bolt A, having a talon or edge face for being acted upon by the key, tumblers B, pivoted as described, for being acted upon by the same key that moves the bolt backward, spring-pressed sliding bolt C, having projection *k*, and the laterally-extending arm *e*, for engagement with the lock-bolt and keeper, respectively, and a stop to limit the distance which the end *k* projects, substantially as described, and for the purpose specified.

4. The combination of a lock having bolts A and C projecting outside of the lock-face, and also operatively connected upon the inside of the lock-case, as described, and a keeper-plate, G, to engage the bolt A and actuate the bolt C, substantially as described, and for the purpose specified.

5. The combination of the spring-pressed and hooked lock-bolt having its hooked end projecting from the face of the lock-case, the spring-pressed sliding bolt C, having the end *k* projecting from the face of the lock-case, and the arm *e* upon the inside of the lock-case, for acting upon the said hooked lock-bolt, substantially as described, and for the purpose specified.

FRANK W. MIX.

Witnesses:
S. C. DUNHAM,
CHAS. F. CORBIN.